G. VOLNAGEL.
LAWN TRIMMER.
APPLICATION FILED NOV. 10, 1910.
999,135.
Patented July 25, 1911.
2 SHEETS—SHEET 1.
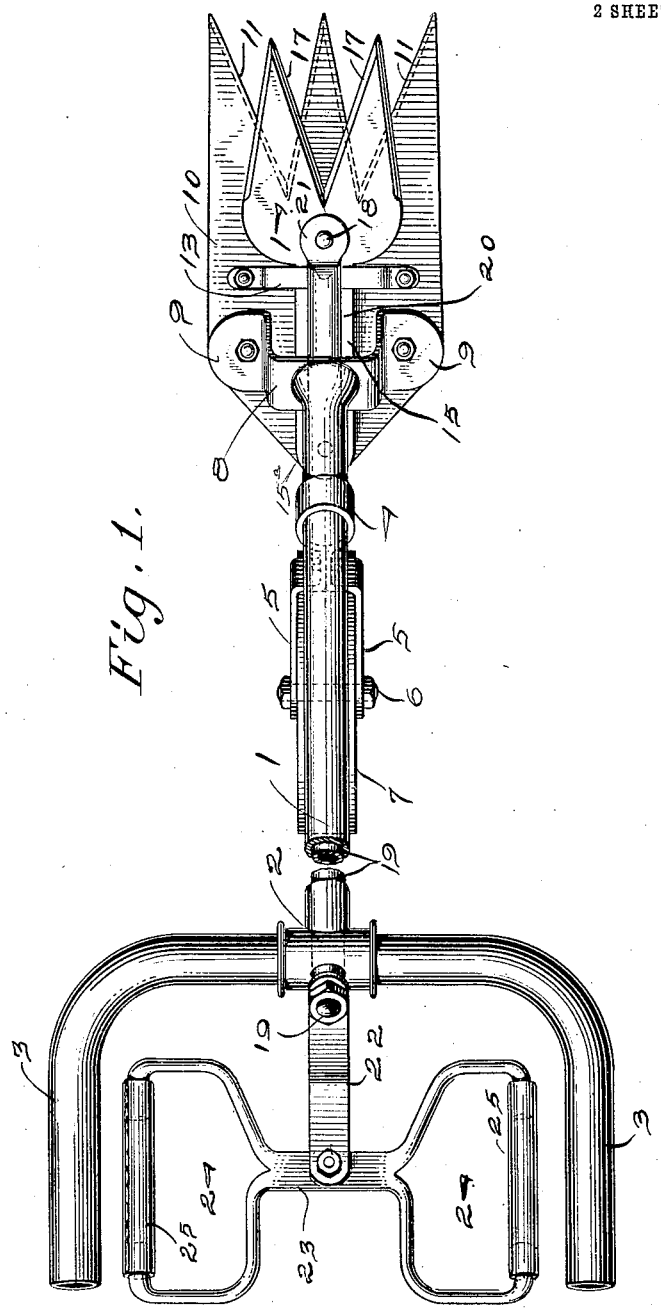

G. VOLNAGEL.
LAWN TRIMMER.
APPLICATION FILED NOV. 10, 1910.
999,135.
Patented July 25, 1911.
2 SHEETS—SHEET 2.
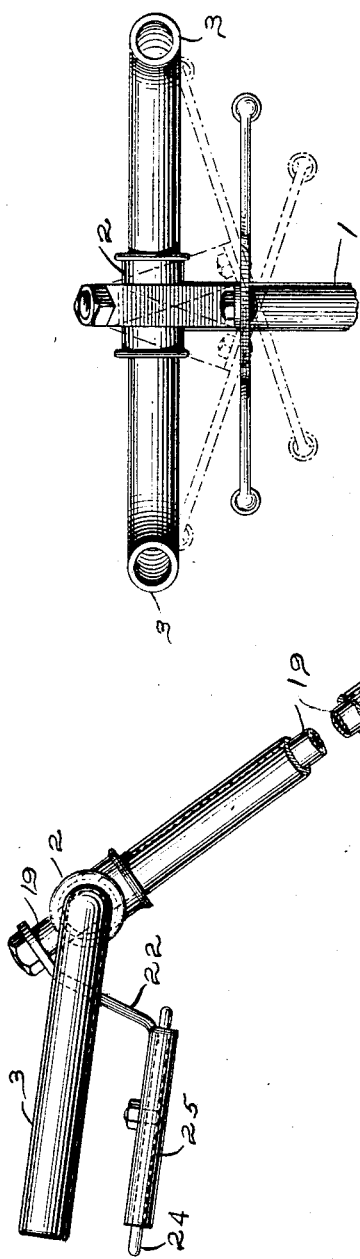
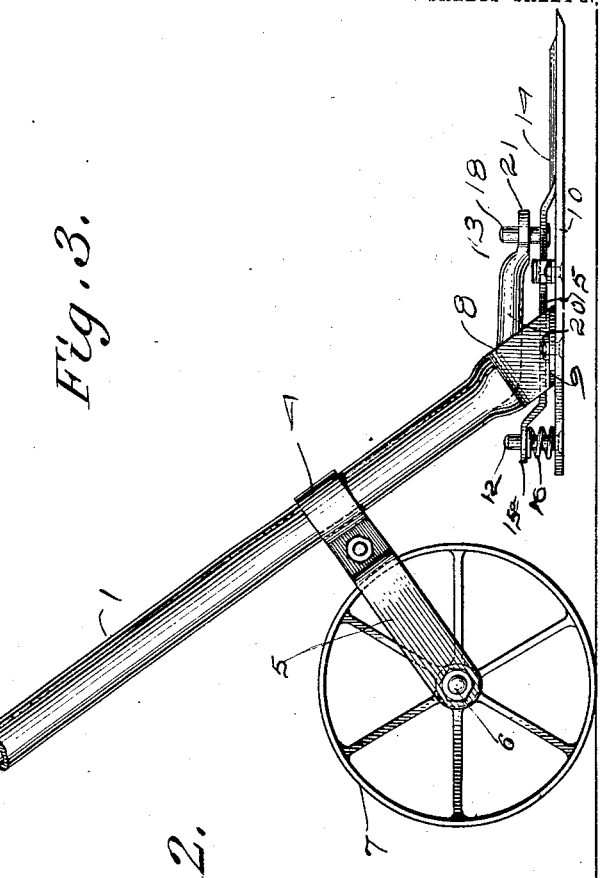

UNITED STATES PATENT OFFICE.

GEORGE VOLNAGEL, OF BREMERTON, WASHINGTON.

LAWN-TRIMMER.

999,135. Specification of Letters Patent. Patented July 25, 1911.

Application filed November 10, 1910. Serial No. 591,635.

*To all whom it may concern:*

Be it known that I, GEORGE VOLNAGEL, a citizen of the United States, residing at Bremerton, in the county of Kitsap and State of Washington, have invented certain new and useful Improvements in Lawn-Trimmers, of which the following is a specification, reference being had therein to the accompanying drawing.

This invention relates to lawn trimmers, and the principal object of the same is to provide a trimmer that can be used on the edges of lawns, in fence corners, around trees and shrubbery and in other places where the usual lawn mower cannot be used.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a top plan view of the improved lawn trimmer. Fig. 2 is a view in side elevation thereof. Fig. 3 is a fragmentary view in rear elevation of the handles of the trimmer.

Referring to the accompanying drawings by numerals, it will be seen that the improved lawn trimmer is composed of a body 1 that is preferably formed of a single length of pipe and has its upper end connected to a T-coupling 2. Handgrips 3 project from opposite ends of said coupling, said handgrips being preferably formed of pipe sections and curved so that their free ends are in spaced parallel relation. Adjacent the lower end, the body 1 is embraced by an adjustable clip 4 from which the hanger bearings 5 project, said bearings carrying an axle 6 on which the supporting wheel or roller 7 is mounted. The lower end of body 1 is split and flattened to provide a yoke 8 that terminates in the outwardly projecting flanges 9 which are bolted or otherwise rigidly but detachably fastened to the upper surface of a flat horizontally arranged stationary blade 10. The forward portion of said blade is provided with the cutting teeth 11.

The rear end of blade 10 carries a vertical pivot stud 12 and at an intermediate point, a guide loop 13 extends transversely across said blade. A movable blade 14 has a reduced shank 15 that extends through the loop 13 and terminates in a raised flat pivot ear $15^a$ that is mounted on the stud 12. A spring 16 is carried by stud 12 and interposed between the ear $15^a$ of shank 15 and the rear end of the stationary blade 10. The said shank 15 is in a higher plane than the blade 14, and it will be clear that the spring 16 normally holds the rear end of the shank elevated so that blade 14 will lie on the top surface of blade 10. Blade 14 is smaller than blade 10, and is equipped with cutting teeth 17 at its forward end. A pivot stud 18 projects vertically from the rear portion of blade 14 in advance of guide loop 13.

An operating shaft 19 extends through body 1 and has its lower end bent at an angle to provide a crank 20 that projects through the yoke 8 and guide loop 13 and terminates in a flattened pivot ear 21 which engages the pivot stud 18 of blade 14. The upper end of shaft 19 projects through and beyond the coupling 2, and has an operating lever 22 rigidly but detachably fastened thereon. Said lever 22 is pivotally connected to a handle 23 which is located between the hand-grips 3 of the body 1. Said handle has end loops 24 which carry elongated rollers 25 that are parallel with the free ends of the handgrips 3, so that when said handgrips 3 are grasped by the user of the trimmer, the rollers 25 can also be grasped.

In use, the machine is propelled by pushing on the handgrips 3, and the movable blade 14 is reciprocated transversely of the stationary blade 10 by moving the handle 23 toward or away from said handgrips 3 so that lever 22 will oscillate shaft 19 and cause the crank 20 to reciprocate the blade 14.

It will be seen from the foregoing that this invention provides a machine that can be readily taken apart so that cleaning and repairing are facilitated.

What I claim as my invention is:—

A lawn mower comprising a body, a support therefor, a stationary blade carried by said body, a pivot stud carried by the rear end of said blade, a guide loop carried by said blade, a movable blade on the stationary blade and having a shank extending through said loop, said shank having its rear end pivotally connected to said stud, a spring carried by said stud for elevating the rear end of said shank and with the coöperation of said loop holding the movable blade in contact with the stationary blade, and a shaft carried by said body and having an end crank extending through the guide loop and pivotally connected to the movable blade.

In testimony whereof I hereunto affix my signature in presence of two witnesses.

GEORGE VOLNAGEL.

Witnesses:
J. W. BRYAN,
F. C. MERCER.

Copies of this patent may be obtained for five cents each, by addressing the "Commissioner of Patents, Washington, D. C."